(12) United States Patent
Chang et al.

(10) Patent No.: US 10,504,133 B2
(45) Date of Patent: Dec. 10, 2019

(54) ADMINISTERING REWARD SCHEMES

(71) Applicant: INTERNATIONAL BUSINESS MACHINES CORPORATION, Armonk, NY (US)

(72) Inventors: Chia-Ru Chang, Taipei (TW); Vincent Y. Deng, Taipei (TW); Pao-Chuan Liao, Taipei (TW); June-Ray Lin, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 744 days.

(21) Appl. No.: 14/927,613

(22) Filed: Oct. 30, 2015

(65) Prior Publication Data
US 2016/0125447 A1 May 5, 2016

(30) Foreign Application Priority Data

Oct. 31, 2014 (TW) .............................. 103137963 A
Mar. 5, 2015 (TW) .............................. 104106973 A

(51) Int. Cl.
*G06Q 30/00* (2012.01)
*G06Q 30/02* (2012.01)
*G05B 19/418* (2006.01)

(52) U.S. Cl.
CPC ................................ *G06Q 30/0226* (2013.01)

(58) Field of Classification Search
CPC ................................................. G06Q 30/0226
See application file for complete search history.

(56) References Cited

U.S. PATENT DOCUMENTS

| | | | |
|---|---|---|---|
| 6,571,216 B1 | 5/2003 | Garg et al. | |
| 7,424,617 B2 * | 9/2008 | Boyd | G06Q 30/02 463/16 |
| 8,799,064 B2 | 8/2014 | Ivers et al. | |
| 2004/0243465 A1 | 12/2004 | Manners | |

(Continued)

FOREIGN PATENT DOCUMENTS

EP 1050835 A2 11/2000

OTHER PUBLICATIONS

The Impact of Reward Programs on Customer Behavior of Commercial Bank. IEEE. 2010. (Year: 2010).*

*Primary Examiner* — Maria V Vanderhorst
(74) *Attorney, Agent, or Firm* — Alexander Jochym; Matthew M. Hulihan; Heslin Rothenberg Farley & Mesiti PC

(57) ABSTRACT

Administering reward schemes. A first reward scheme is predefined by a computer system, the first reward scheme defining a first reward event. A second reward scheme is obtained externally by the computer system, the second reward scheme defining a second reward event. In response to an action by a user, the computer system determines whether the first reward event or the second reward event has been triggered. If the first reward event has been triggered, the computer system calculates a first reward for the user according the first reward scheme and if the second reward event has been triggered, the computer system calculates a second reward for the user according the second reward scheme. The second reward scheme may be obtained by, and shared to, the computer system as an inheritance of rules within an organization.

20 Claims, 4 Drawing Sheets

(56) References Cited

U.S. PATENT DOCUMENTS

| | | | |
|---|---|---|---|
| 2005/0080727 A1* | 4/2005 | Postrel | G06Q 20/06 |
| | | | 705/39 |
| 2011/0111818 A1* | 5/2011 | Baerlocher | G07F 17/3244 |
| | | | 463/11 |
| 2013/0036001 A1 | 2/2013 | Wegner et al. | |
| 2014/0025466 A1 | 1/2014 | Bortolin et al. | |
| 2014/0164037 A1 | 6/2014 | Rao et al. | |
| 2017/0330217 A1* | 11/2017 | Postrel | G06Q 30/0233 |

\* cited by examiner

ADMINISTERING REWARD SCHEMES

PRIOR FOREIGN APPLICATIONS

This application is based on and claims the benefit of priorities from Taiwan Patent Application 103137963, filed on Oct. 31, 2014 and from Taiwan Patent Application 104106973, filed on Mar. 05, 2015, each of which is hereby incorporated herein by reference in its entirety.

BACKGROUND

One or more aspects of the invention generally relate to administering reward schemes, and more particularly, to methods sharing a reward scheme to another reward scheme.

Whether in marketing or organizational management, reward schemes may effectively enhance customer loyalty or employee productivity and compliance. Extensive reward schemes are mostly administered with the assistance of automatic information systems, such as reward point schemes of credit card companies or mileage schemes of airlines.

For more prior art about using computer systems to administer reward schemes, refer to EP 1050835, U.S. Pat. No. 6,571,216, U.S. Pub. No. 2004/0243465, and U.S. Pub. No. 2013/0036001, each of which is hereby incorporated herein by reference in its entirety.

SUMMARY

Shortcomings of the prior art are overcome and additional advantages are provided through the provision of a method for administering reward schemes, the method including: pre-defining a first reward scheme, the first reward scheme defining a first reward event; obtaining a second reward scheme externally, the second reward scheme defining a second reward event; determining whether at least one of the first reward event or the second reward event have been triggered in response to an action by a user; based on the first reward event having been triggered, determining a first reward for the user according to the first reward scheme; and based on the second reward event having been triggered, notifying a predetermined entity of the second reward event or determining a second reward for the user according to the second reward scheme.

Further, a computer system is provided that includes a memory and a processor in communications with the memory, wherein the computer system is configured to perform a method including: pre-defining a first reward scheme, the first reward scheme defining a first reward event; obtaining a second reward scheme externally, the second reward scheme defining a second reward event; determining whether at least one of the first reward event or the second reward event have been triggered in response to an action by a user; based on the first reward event having been triggered, determining a first reward for the user according to the first reward scheme; and based on the second reward event having been triggered, notifying a predetermined entity of the second reward event or determining a second reward for the user according to the second reward scheme.

Yet further, a computer program product including a computer readable storage medium readable by a processor and storing instructions for execution by the processor is provided for performing a method that includes: pre-defining a first reward scheme, the first reward scheme defining a first reward event; obtaining a second reward scheme externally, the second reward scheme defining a second reward event; determining whether at least one of the first reward event or the second reward event have been triggered in response to an action by a user; based on the first reward event having been triggered, determining a first reward for the user according to the first reward scheme; and based on the second reward event having been triggered, notifying a predetermined entity of the second reward event or determining a second reward for the user according to the second reward scheme.

Additional features and advantages are realized through the concepts described herein.

BRIEF DESCRIPTION OF THE DRAWINGS

In order that the advantages of embodiments of the invention will be readily understood, a more particular description of embodiments of the invention described herein may be rendered by reference to specific embodiments that are illustrated in the drawings. Understanding that these drawings depict only example embodiments of the invention and are therefore not to be considered to be limiting of its scope, embodiments of the invention are described and explained with additional specificity and detail through the use of the accompanying drawings in which.

DETAILED DESCRIPTION

Figure 1:
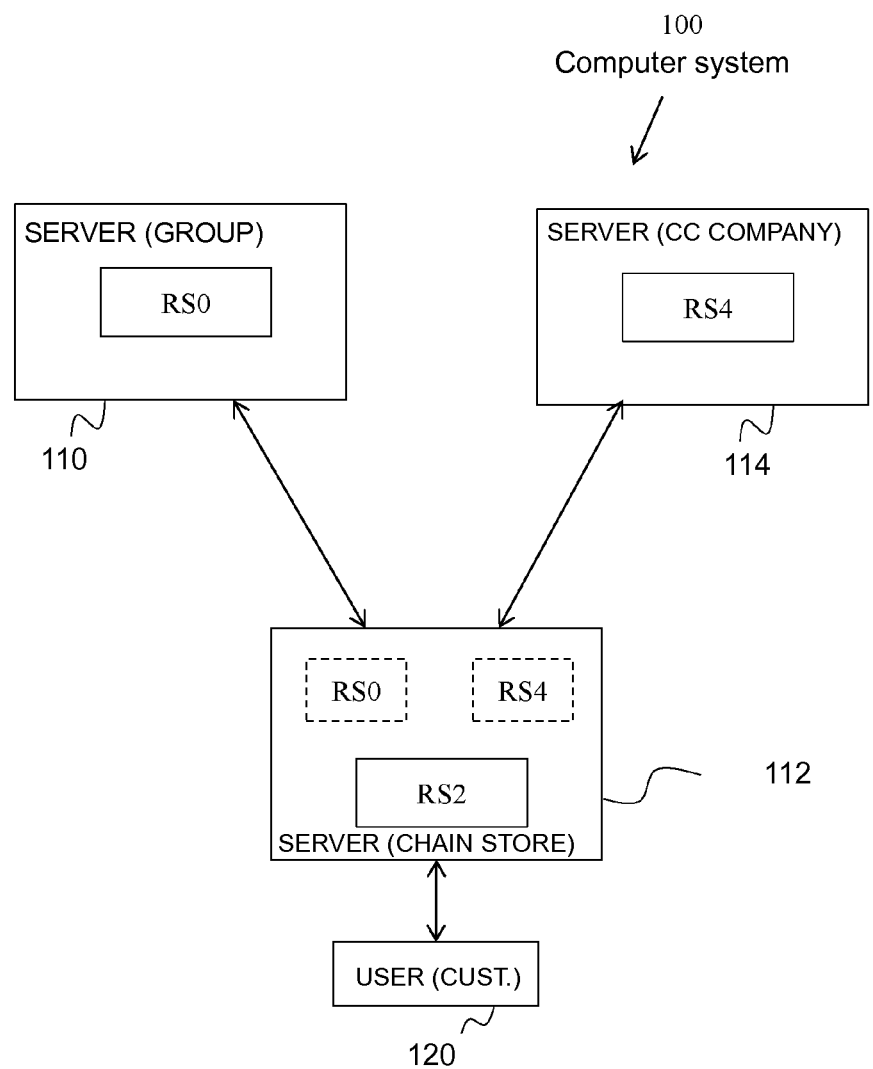
FIG. 1 depicts an example computer system of an embodiment of the invention.

Reference herein to "one embodiment," "an embodiment," or similar language means that a particular feature, structure, or characteristic described in connection with the embodiment may be included in an embodiment of aspects described herein. Thus, appearances of the phrases "in one embodiment," "in an embodiment," and similar language throughout this specification may, but do not necessarily, refer to the same embodiment.

As will be appreciated by one skilled in the art, aspects of the present invention may be embodied as a computer system/device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of aspects described herein, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2A:
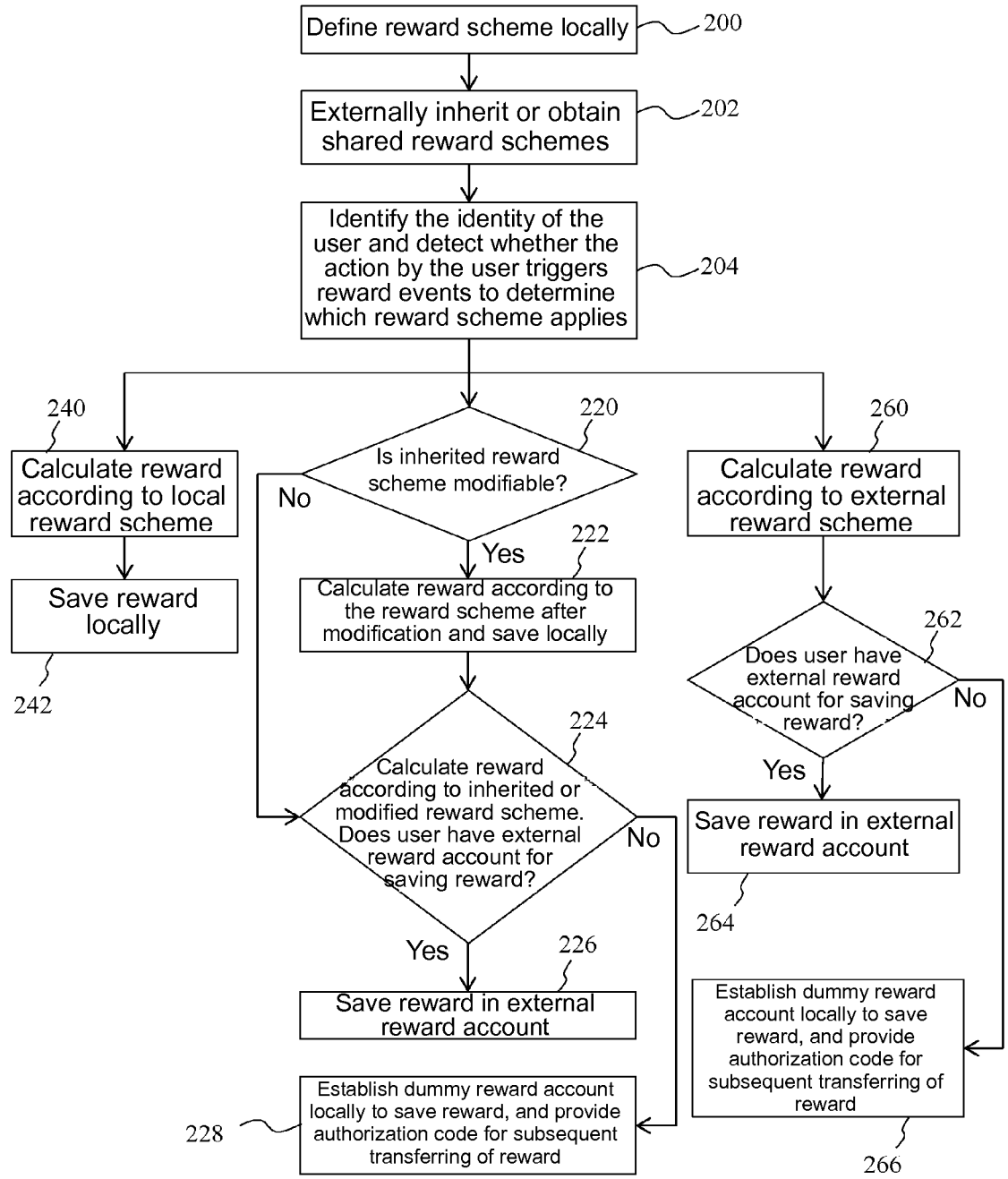
FIGS. 2A and 2B depict example flowcharts of methods of embodiments of the invention.
Figure 2B:
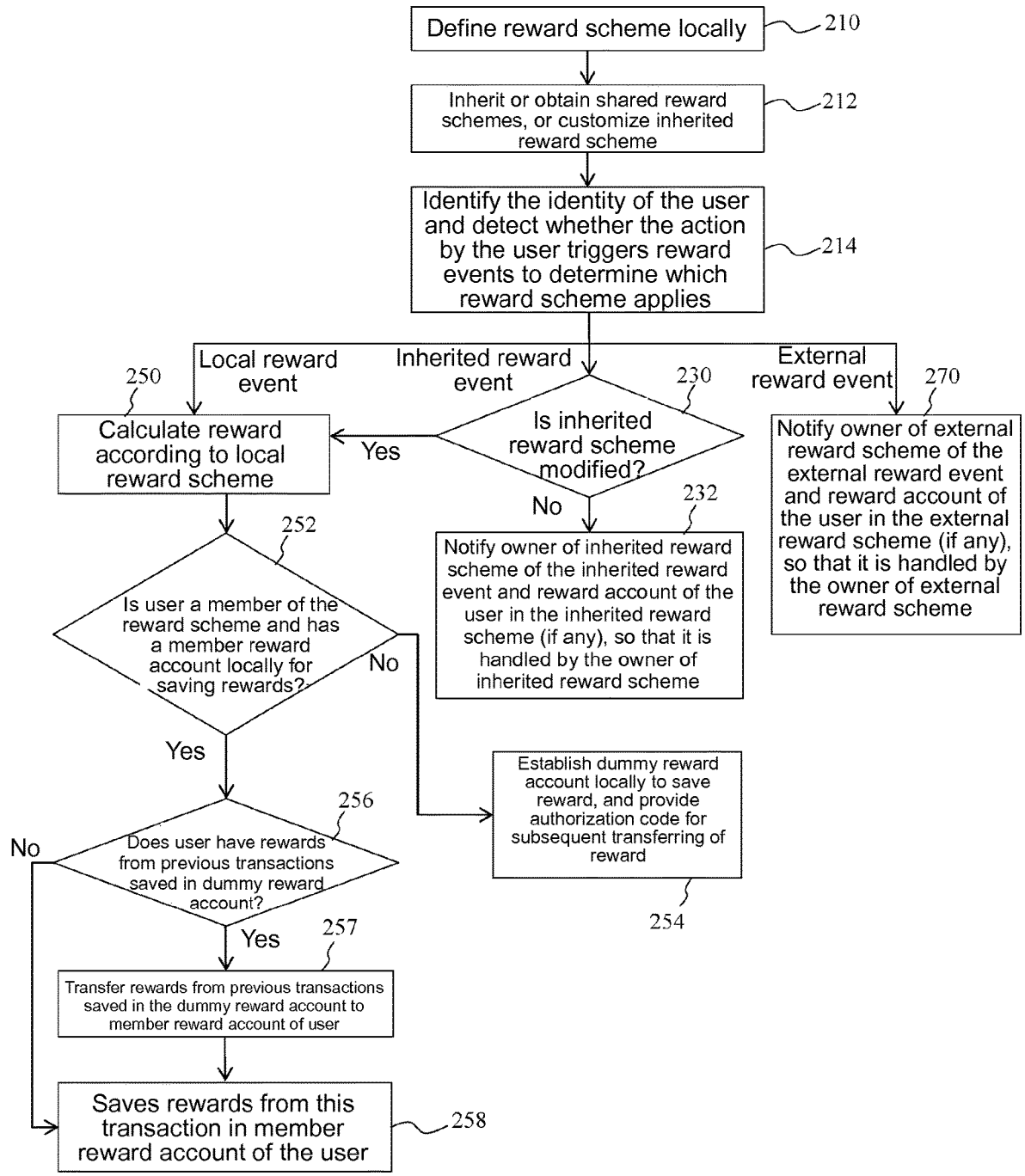
Figure 3:
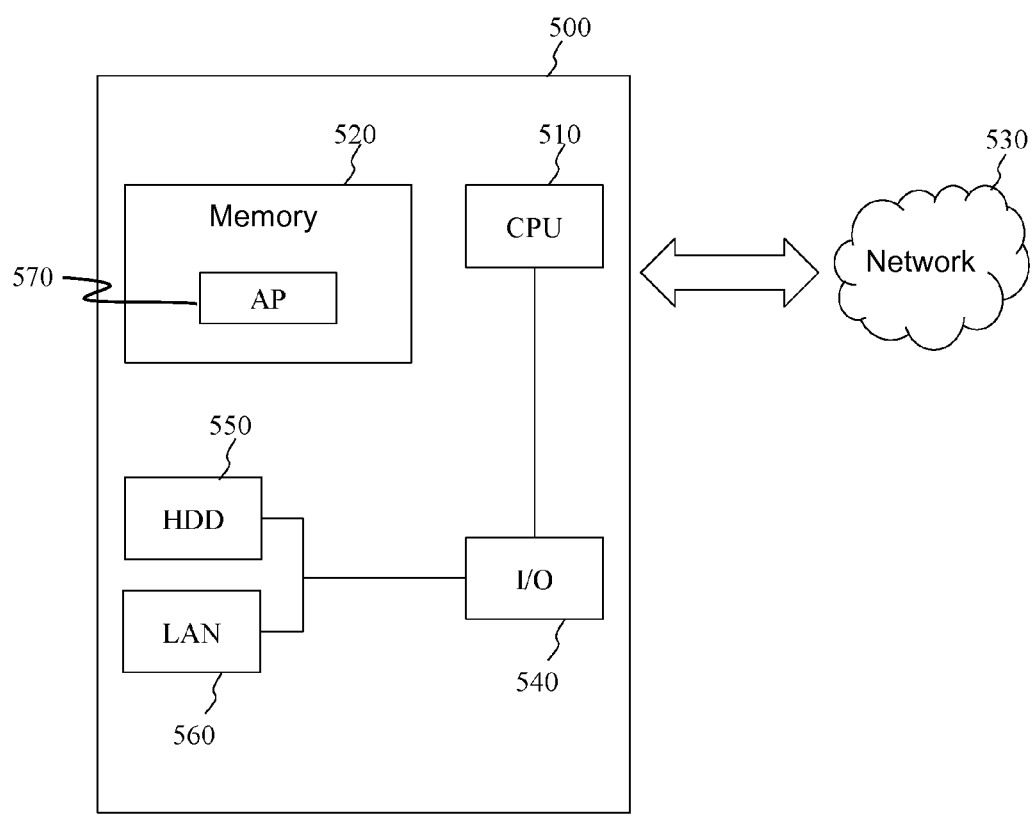
FIG. 3 depicts an example computer device of an embodiment of the invention.

Referring now to FIG. 1 through FIG. 3, computer systems/devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 shows a schematic of the architecture of a computer system 100 of an embodiment of the invention for those skilled in the related art to understand aspects of the invention, but not for restricting the scope of aspects of the invention. In an exemplary embodiment, the computer system 100 comprises a server 110, a server 112, and a server 114 that may communicate with each other via a network (not shown).

The network can also come in a connection of any type, including a wide area network (WAN) or a local area network (LAN) with static IP, or a temporary connection to the Internet through an Internet service provider (ISP), whether by cable connection or by wireless connection. Persons skilled in the art are able to understand that the network can also have other hardware and software elements (such as an additional computer system, a router, or a firewall) not shown in the accompanying drawings.

The servers 110, 112, and 114 may be implemented with general-purpose computers, special application computers, high-end workstations, mainframe computers, etc., such as System X, Blade Center, or eServer offerings offered by International Business Machines Corporation, Armonk, N.Y., U.S.A. (System X, Blade Center and/or eServer may be trademarks of International Business Machines Corporation). In an embodiment, the servers 110, 112, and 114 may have different physical locations and communicate by a backbone network; therefore, for each server, the other servers may be located at external networks. However, in another embodiment, the servers 110, 112, and 114 may be constructed as virtual servers in a server room provided by the same cloud service provider.

To illustrate aspects described herein, in this embodiment, the server 110 is managed and maintained by a retail group which defines a reward scheme RS0; the server 112 is managed and maintained by a chain store (or brand) of the retail group which defines a reward scheme RS2; and the server 114 is managed and maintained by a credit card company outside the retail group which defines a reward scheme RS4. U.S. Pat. No. 6,571,216 provides further details of reward schemes.

Aspects described herein may be implemented to comprise multiple servers 110 (belonging to different business divisions of the group), multiple servers 112, and multiple servers 114, and the numbers of which are not limited. More particularly, the multiple servers 110 may belong to different business divisions of the group and each may provide different reward schemes RS0, the multiple servers 112 may belong to different chain stores of the group and each may provide different reward schemes RS2, and the multiple servers 114 may belong to different credit card companies and each may provide different reward schemes RS4.

More particularly, the server 112 is provided to a user 120 (i.e., facing a customer) and identifies the identity of the user 120, and further detects an action by the user 120. For example, in the case of purchasing at a physical store, the server 112 may connect to a Point-of-Sale system (not shown) at the store to access a membership card presented by the user 120, and be aware of the transactions or actions executed by the user 120; in the case of purchasing online, the server 112 itself may provide web services or other user interfaces (both not shown) for the user 120 to log in with an account and operate, or may detect the transactions or actions executed by the user 120 by connecting to an online-trading system. The details may be found in prior art and are not described here.

In the embodiment of FIG. 1, the server 110 managed by the retail group and the server 114 managed by the credit card company are not provided to the user 120, and depend on the server 112 managed by the chain store to be aware of the transactions or actions executed by the user 120. In other words, in some embodiments, the server 112 is not only a reward scheme owner of the reward scheme RS2 but also a distribution agent of the reward schemes, though embodiments of the invention are not limited thereto. U.S. Pat. No. 6,571,216 provide details of the reward scheme owner and the distribution agent of reward schemes, the entirety of which is incorporated by reference herein. Since the server 112 also shares the reward scheme RS0 of the server 110 and the reward scheme RS4 of the server 114, the server 112 may functionally act as the reward scheme owner of the reward schemes RS0 and RS4. However, as the reward schemes RS0 and RS4 are not actually defined by the sever 112, when the sever 112 acts as the distribution agent of reward schemes, the server 112 may calculate rewards for the user 120 according to the shared reward schemes RS0 and RS4 in addition to calculating rewards for the user 120 according to the reward scheme RS2 defined by itself (locally). Further details of aspects described herein are described with subsequent flowcharts.

Many functional units described herein may be labeled as modules in order to more particularly emphasize their implementation independence in accordance with some embodiments. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions, which may, for instance, be organized as an object, procedure, or function. Nevertheless, executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Aspects described herein are illustrated with several embodiments herein, though persons skilled in the art should understand that embodiments of the present invention are not limited to the specific embodiments described herein.

FIG. 2A shows a flowchart of an exemplary embodiment of the invention, which in FIG. 2A is a method for administering reward schemes in accordance with aspects of the computer system 100 shown in FIG. 1.

At 200, as the reward scheme owner of the reward scheme RS2, the server 112 (belonging to the chain store) pre-defines the reward scheme RS2 locally. Similarly, as the reward scheme owner of the reward scheme RS0, the server 110 (belonging to the retail group) pre-defines the reward scheme RS0; as the reward scheme owner of the reward scheme RS4, the server 114 (belonging to the credit card company) pre-defines the reward scheme RS4. It is understood that the reward scheme owners of each of the reward schemes may modify their reward schemes at anytime.

The reward schemes may include one or multiple rules and reward events applicable to each rule. For instance, the reward event may be purchasing a specific product or exceeding a specific amount of money, and the rule may be the type and calculation of the reward. The following shows examples for illustrative purposes:

Reward scheme RS0 of the retail group defines: granting 1 reward point of the retail group when an amount of a single purchasing exceeds USD 100;

Reward scheme RS2 of the chain store defines: granting 1 gift point of the chain store when an event of purchasing a product X occurs;

Reward scheme RS4 of the credit card company defines: granting 1 cash discount point when an event of purchasing the product X with a credit card Y occurs.

At 202, the server 112 connects to the servers 110 and 114 by network to obtain the shared reward schemes RS0 and RS4. Since the servers 110 and 114 may modify the reward schemes RS0 and RS4 anytime, the servers 110 and 114 may separately communicate with the server 112 to provide the latest reward schemes RS0 and RS4. In comparison, the reward scheme RS2 may be saved on the server 112 and not shared to the servers 110 and 114.

Since the chain store is in this example subordinate to the retail group and is at a lower level, the server 112 may obtain the reward scheme RS0 as an inheritance of rules within the organization from the server 110. U.S. Pat. No. 7,685,156, which is hereby incorporated herein by reference in its entirety, may be referred to for further details. Under certain circumstances, the inheritance of rules may allow an entity at a lower level to override the rules inherited from an entity at a higher level.

In comparison, since the credit card company may not be subordinate to the retail group, the server 112 may only obtain the reward scheme RS4 from the server 114 by prearrangements, and the inheritance of rules at 220 (infra) may not necessarily be available. In general, the reward scheme RS4 of the credit card company may also not be allowed to be modified by the server 112 of the chain store.

More particularly, for illustrative purposes, for the server 112, the reward scheme RS2 may be termed as "local reward scheme", the reward scheme RS0 may be termed as "inherited reward scheme", and the reward scheme RS4 may be termed as "external reward scheme".

At 204, the server 112 identifies the identity of the user 120 (the customer) and detects the action by the user 120, and respectively determines whether the reward events of each of the reward schemes have been triggered in response to the action by the user 120. For example, if the user 120 purchases the product X of a price of USD 150 with the credit card Y at the chain store, the reward events of each of the above reward schemes RS0, RS2, and RS4 have all been triggered, and the flow proceeds to 220, 240, and 260, respectively, which shall be described later. More particularly, for illustrative purposes, for the server 112, the reward event triggering the reward scheme RS2 may be termed as "local reward event", the reward event triggering the reward scheme RS0 may be termed as "inherited reward event", and the reward event triggering the reward scheme RS4 may be termed as "external reward event".

In another embodiment, 202 and 204 may proceed simultaneously; in other words, after the server 112 detects the action by the user 120, the server 112 communicates with the servers 110 and 114 to inquire whether the inherited reward event and the external reward event of the reward schemes RS0 and RS4 have been triggered in response to the action by the user 120; if the responses from the servers 110 and 114 are positive, the server 112 obtains the rules of the calculation of the rewards of the reward schemes RS0 and RS4 from the servers 110 and 114.

At 220, for the inherited reward event, the server 112 determines whether the reward scheme RS0 inherited from the server 110 is modifiable and whether modifications are indicated. For instance, for an exclusive promotion activity of the chain store, the server 112 may be allowed to modify the reward scheme RS0 so that in addition to granting 1 reward point of the retail group when an amount of a single purchasing exceeds USD 100, 2 gift points of the chain store are further granted. If the determination at 220 is Yes, the flow proceeds to 222; if not, 222 is bypassed and the flow proceeds to 224.

At 222, the server 112 modifies the reward scheme RS0 and calculates the gift points of the chain store for the user 120 according to the reward scheme RS0 after modification, and saves the gift points in an account maintained by the server 112. The flow then proceeds to 224.

At 224, the server 112 calculates the reward points of the retail group for the user 120 according to the reward scheme RS0 inherited from the server 110 or the reward scheme RS0 after modification in 222. In order to save the reward points of the retail group granted to user 120, the server 112 transmits identification information of the user 120 to the server 110 to determine whether the user 120 has a reward account of the retail group on the server 110.

At 226, if the determination at 224 is Yes, the server 112 saves the reward points of the retail group granted to user 120 during this transaction in the reward account maintained by the server 110.

At 228, if the determination at 224 is No, the server 112 establishes a dummy reward account of the user 120 locally and saves the reward points of the retail group granted to the user 120 during this transaction in the dummy reward account. The dummy reward account may be different from the account maintained by the server 112 at 222. Subsequently, the server 112 generates an authorization code for the dummy reward account, and provides the authorization code to the user 120 (by denoting on a receipt or additionally notifying the user 120 by email). If the user 120 subsequently has the reward account of the retail group on the server 110, the authorization code may be used by the user 120 to indicate that the server 112 transfer the reward points of the retail group in the dummy reward account to the reward account of the retail group maintained by the server 110.

At 240, for the local reward event, since the server 112 is the reward scheme owner of the reward scheme RS2, the server 112 calculates a reward according to the reward scheme RS2. In this embodiment, the server 112 grants 1 gift point of the chain store in response to the user 120 purchasing the product X.

At 242, the server 112 saves the gift points of the chain store granted to the user 120 at 240 in the account maintained by the server 112.

At 260, for the external reward event, the server 112 calculates a reward according to the reward scheme RS4. In this embodiment, the server 112 grants 1 cash discount point in response to the user 120 purchasing the product X with the credit card Y.

At 262, in order to save the cash discount points of the credit card company granted to the user 120 at 260, the server 112 transmits identification information of the user 120 to the server 114 to determine whether the user 120 has a cash discount account of the retail group of the credit card company on the server 114.

At 264, if the determination of 262 is Yes, the server 112 saves the cash discount points granted to user 120 during this transaction in the cash discount account maintained by the server 114. Generally speaking, the cash discount account maintained by the server 114 may be a credit card number, and the server 112 also obtains the credit card number when handling the transaction.

At 266, if the determination at 262 is No, the server 112 establishes a dummy reward account of the user 120 locally as at 228 and saves the cash discount points granted to user 120 during this transaction in the dummy reward account, and the server 112 generates an authorization code for the user 120 to subsequently indicate that the server 112 transfer the cash discount points from the server 112 to the cash discount account maintained by the server 114. This can happens when the reward scheme RS4 of the credit card company desires the user 120 to further register.

In addition, in another embodiment other than that shown in FIG. 2A, only determination of the inherited reward events in the reward scheme RS0 are provided by the server 110 to the server 112 (or set by the server 112 itself) at first, and when the server 112 determines that the inherited reward events have been triggered in response to the action by the user 120, the server 112 further communicates with the server 110 to inquire the rules in the reward scheme RS0 corresponding to the inherited reward events, for instance to inquire whether the server 110 authorizes the server 112 to modify such inherited rules.

If the server 112 is authorized to modify, 222-228 of FIG. 2A described above shall proceed. If the server 112 is not authorized to modify, subsequent operations may be taken over by the server 110; that is, the server 110 may calculate the reward (i.e., the reward points of the retail group) for the user 120 according to the reward scheme RS0. It should be particularly noted that, as like the server 112 described above may share the reward scheme RS0 of the server 110, the server 110 may also share or inherit reward schemes of other servers (not shown) and calculate the reward for the user 120 accordingly.

Subsequently, the server 112 may transmit identification information of the user 120 to the server 110 for the server 110 to determine whether the user 120 has the reward account of the retail group on the server 110. If the determination is Yes, the server 110 may save the calculated reward in the reward account of the retail group of the user 120 on the server 110. If the determination is No, the server 110 may transmit the calculated reward back to the server 112, and the server 112 may establish a dummy reward account locally and save the reward calculated by the server 110 for user 120 in the dummy reward account.

FIG. 2B shows a flowchart of another exemplary embodiment of the invention, which is a method for administering reward schemes in accordance with aspects of the computer system 100 shown in FIG. 1.

At 210, as the reward scheme owner of the reward scheme RS2, the server 112 (belonging to the chain store) pre-defines the reward scheme RS2 locally. Similarly, as the reward scheme owner of the reward scheme RS0, the server 110 (belonging to the retail group) pre-defines the reward scheme RS0; as the reward scheme owner of the reward scheme RS4, the server 114 (belonging to the credit card company) pre-defines the reward scheme RS4. 200 in FIG. 2A may be referred to.

At 212, the server 112 connects to the servers 110 and 114 by network to obtain the shared reward schemes RS0 and RS4. More particularly, the server 112 may obtain the reward scheme RS0 as an inheritance of rules from the server 110; 202 in FIG. 2A may be referred to. More particularly, for illustrative purposes, for the server 112, the reward scheme RS2 may be termed as "local reward scheme", the reward scheme RS0 may be termed as "inherited reward scheme", and the reward scheme RS4 may be termed as "external reward scheme". In addition, if the server 112 is authorized to modify the reward scheme RS0, the server 112 may modify (customize) the reward scheme RS0 according to specification and save locally, as like the local reward scheme RS2.

At 214, the server 112 identifies the identity of the user 120 (the customer) and detects the action by the user 120, and respectively determines whether the reward events of each of the reward schemes have been triggered in response to the action by the user 120. 204 in FIG. 2A may be referred to. Subsequently, the flow proceeds to 230, 250, and 270, respectively, which shall be described later. More particularly, for illustrative purposes, for the server 112, the reward event triggering the reward scheme RS2 may be termed as "local reward event", the reward event triggering the reward scheme RS0 may be termed as "inherited reward event", and the reward event triggering the reward scheme RS4 may be termed as "external reward event".

At 230, for the inherited reward event, the server 112 determines whether the reward scheme RS0 inherited from the server 110 has been modified. If the determination at 230 is No, which means it has not been modified, the flow proceeds to 232, and the server 112 notifies the reward scheme owner of the reward scheme RS0, i.e., the server 110, of the inherited reward event determined to trigger the reward scheme RS0 at 214, so that it is handled by the server 110. For the server 110, this event may be deemed as a local reward event for handling or calculating rewards, and may be saved locally in the server 110. In addition, if the server 112 is aware of the reward account of the user 120 in the reward scheme RS0, it may be provided to the server 110 together. For subsequent local operations of the server 110, 250 to 258 of the server 112 described later may be referred to.

If the determination at 230 is Yes, which means the inherited reward scheme RS0 has been modified, the flow proceeds to 250 and the server 112 handles according to the reward scheme RS0 after modification saved locally as like the local reward scheme RS2, i.e., the inherited reward event is handled as a local reward event.

At 250, for the local reward event, since the server 112 is the reward scheme owner of the reward scheme RS2, the server 112 calculates the reward according to the reward scheme RS2. For the above case of handling the inherited reward event as a local reward event, the server 112 calculates the reward according to the reward scheme RS0 after modification.

At 252, to save the reward calculated at 250, the server 112 determines whether the user 120 is a member of the reward scheme and has a member reward account locally at the server 112 for saving rewards, such as by obtaining from the user 120 a membership card number.

At 254, if the determination at 252 is No, which means that the user does not have a member reward account at the server 112 for saving rewards (such as due to unfinished registration or authentication procedures), the server 112 establishes a dummy reward account of the user 120 locally and saves the reward granted to the user 120 during this transaction in the dummy reward account, and generates an authorization code for the user 120 so that if the user 120 subsequently has the member reward account, the rewards in the dummy reward account may be transferred to the member reward account or other accounts appointed by the user 120.

At 256, if the determination at 252 is Yes, which means that the user 120 already has a member reward account at the server 112 for saving rewards, the server 112 further determines whether the user 120 previously has a dummy reward account established locally (such as according to the authorization code presented by the user 120; refer to 254), and whether the dummy reward account saves rewards from previous transactions. If Yes, the flow proceeds to 257; if not, the flow proceeds to 258.

At 257, the server 112 transfers the rewards from previous transactions saved in the dummy reward account to the member reward account of the user 120, and the flow proceeds to 258.

At 258, the server 112 saves the rewards from this transaction in the member reward account of the user 120.

At 270, for the external reward event, the server 112 notifies the server 114 of the external reward event determined to trigger the reward scheme RS4 at 214 to be handled by the server 114. For the server 114, this event may be deemed as a local reward event for handling or calculating rewards, and may be saved locally in the server 114. In addition, if the server 112 is aware of the member reward account of the user 120 in the reward scheme RS4, it may be provided to the server 114 together. For subsequent local operations of the server 114, 250 to 258 of the server 112 may be referred to. It should be noted that, in this embodiment, the reward scheme RS4 is set as not allowed to be modified.

As described at 220 to 228 of FIG. 2A, the server 112 may calculate corresponding rewards for the user 120 according to the reward scheme RS0 obtained externally and save in the server 110 or 112, or as described at 232 of FIG. 2B, the server 110 may calculate and save rewards for the user 120 according to the reward scheme RS0 owned by itself. More particularly, in the case of online trading, since only the server 112 is provided to the user 120, despite that the rewards were granted according to the inherited reward scheme RS0, the user 120 may still wish to browse the record of the rewards by the server 112. In one embodiment, the server 112 pre-defines a display structure (such as cascading style sheets, but embodiments of the invention are not limited thereto) locally, and when the user 120 wishes to browse the record of the rewards granted according to the inherited reward scheme RS0, the server 112 may obtain related information from the server 110 yet display the record of the rewards granted according to the inherited reward scheme RS0 according to the display structure defined by the server 112 itself. Such an approach maintains the coherence of the style of the website when the server 112 displays the record of the rewards to the user 120, and since the server 112 may identify the user 120, such an approach may also adopt suitable display structures for specific users 120.

In another embodiment, the server 110 provides the display structure to the server 112, and thus the server 112 displays the record of the rewards granted according to the inherited reward scheme RS0 according to the display structure provided by the server 110. As the display structure also comprises one or multiple rules, the server 112 may obtain the display structure as an inheritance of rules from the server 110 to display the record of the rewards granted according to the inherited reward scheme RS0, which is similar to the server 112 obtaining the reward scheme RS0 as an inheritance of rules from the server 110 at 202. Whether the display structure provided by the server 110 is allowed to be modified by the server 112 may also be set.

It should be mentioned that, although the above embodiments are applied in the sales of products, embodiments of the invention are not limited thereto. Aspects described herein may also be applied in organizational management or business process gamification, details of which are provided in U.S. Pat. No. 8,768,751, U.S. Pub. No. 2013/0007155, and/or Taiwanese Pat. App. 103134136, which are hereby incorporated herein by reference in their entirety.

FIG. 3 further shows a hardware environment block diagram of a computer device 500, which may serve as the servers 110, 112, and 114 in FIG. 1.

In one embodiment, the computer device 500 has a processor to execute dedicated application programs, a storage device to save various information and program codes, a communication and input/output device to act as an interface for users to communicate with, and peripheral devices or other specific usage devices. In other embodiments, aspects described herein may also be implemented with other forms and have more or less apparatuses or devices.

As shown in FIG. 3, the computer device 500 may have a processor 510, a memory 520, and an input/output (I/O) unit 540. The I/O bus may be a high-speed serial bus such as a PCI-e bus, yet other bus architectures may also be used. Other connections to the I/O bus may be connected directly to the devices or through expansion cards. The I/O unit 540 may also be coupled to a hard disk 550 and/or a local area network (LAN) adaptor 560. By the LAN adaptor 560, the computer device 500 may communicate with other computer devices through a network 530. The network 530 may be implemented with any type of connection including static LAN connections or wide area network (WAN) connections or dialup networking by Internet service providers. The connection scheme is also not limited and may include wired or wireless connections such as communications with user computers by wireless networks of GSM or Wi-Fi. However, it should be understood that other hardware and software components (such as additional computer systems, routers, firewalls, etc.) may be included in the network despite not being shown in the figures. The memory 520 may be a random access memory (RAM), a read-only memory (ROM), or an erasable programmable read-only memory (EPROM or Flash memory). The memory 520 is used to save an operating system, program codes of a dedicated main program AP 570, and various information. The operating system may be executed on the processor 510 and may coordinate and provide control of various devices in the computer device 500. The processor 510 may access the memory 520 to execute the main program AP 570.

Those skilled in the art may understand that the hardware of the computer device 500 in FIG. 3 may have various modifications according to different embodiments. Other internal hardware or peripheral devices such as Flash ROM, equivalent non-volatile memory, optical drive, etc. may be added to or replace the hardware shown in FIG. 3.

As described herein, an embodiment of the present invention provides a computer-implemented method for administering reward schemes, and more particularly, embodiments of the present invention may share multiple reward schemes by a single computer system (i.e., the computer system facing the user) to provide to the user, and may allow each reward scheme to be dynamically adjusted. Therefore, the user need not be required to individually handle or log in multiple computer systems.

It is recognized that, although reward schemes may have substantial benefits in marketing or organizational management, as products diversify or as differences in job contents of employees of an organization increase, the design and management of reward schemes may become the issues.

For instance, a retail group generally has multiple different chain stores (or brands). In some approaches, each chain store (or brand) serving the customers is the reward scheme owner and provides their individual customer reward scheme to the customers, and separately maintain their reward scheme accounts (or separately issue their reward membership card). Excessive accounts or membership cards may result in inconveniences for the customers. On the other hand, each chain store (or brand) independently designs their customer reward scheme, and only uses the basic policies set by the group as reference at most. Such may result in difficulties in the management and integration of reward schemes on the inter-group level, and the customer reward schemes provided by each chain store (or brand) lack common grounds, which impedes the full exploitation of the advantages of reward schemes on the inter-group level.

Aspects described herein integrate multiple reward scheme owners and provide to the user or customer by a single computer system. For example, reward schemes having common grounds and applying to multiple chain stores may be owned and maintained and updated at the group level, while chain stores subordinate to the group are the owners of reward schemes only applying to their own extents, and provide the computer system of the chain store to the customer. Therefore, when the computer system of the chain store handles customer purchasing, in addition to adopting reward schemes maintained by itself, if it is determined that group-level reward schemes are to be adopted, the computer system of the chain store may connect externally to the group-level computer system to obtain the latest version or even to modify and adjust it. In other words, by aspects described herein, a reward scheme owner (the group) may share its reward scheme to other reward scheme owners (the chain stores).

By similar approaches, the computer system of the chain store may also externally obtain or share reward schemes provided by a third party. Therefore, the customer may handle only the computer system of a single chain store (or use the reward membership card of a single chain store) to be simultaneously applicable for multiple reward schemes of different reward scheme owners, and may respectively obtain the corresponding rewards.

In view of the above, an embodiment of the present invention provides a computer-implemented method for administering reward schemes, comprising the following steps:

pre-defining, by a computer system, a first reward scheme, the first reward scheme defining a first reward event;

obtaining, by the computer system, a second reward scheme externally, the second reward scheme defining a second reward event;

determining, by the computer system, whether at least one of the first reward event and the second reward event have been triggered in response to an action by a user;

calculating, by the computer system, a first reward for the user according to the first reward scheme if the first reward event has been triggered; and calculating, by the computer system, a second reward for the user according to the second reward scheme obtained externally if the second reward event has been triggered.

Another embodiment of the present invention provides a computer program product, stored on a computer-readable medium and comprising a computer-readable program to be executed on a computer device to implement the method described above.

Another embodiment of the present invention provides a computer system comprising an appliance that comprises a bus system, a memory, and a processing unit, wherein the memory saves a set of computer-executable instructions and the processing unit executes the set of computer-executable instructions to implement the method described above.

Reference throughout this specification to features, advantages, or similar language does not imply that all of the features and advantages that may be realized with embodiments of the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the embodiments of the invention may be combined in any suitable manner in one or more embodiments. One skilled in the relevant art will recognize that embodiments of the invention may be practiced without one or more of the specific features or advantages of a particular embodiment. In other instances, additional features and advantages may be recognized in certain embodiments that may not be present in all embodiments of the invention. The following description, the appended claims, and the embodiments of the present invention further illustrate the features and advantages of embodiments of the present invention.

Aspects described herein can be embodied in any other specific manners without departing from the spirit or essential features of embodiments of the present invention. Aspect of the aforesaid embodiments of the present invention shall be deemed illustrative rather than restrictive of embodiments of the present invention. Hence, the scope of aspects described herein is defined by the appended claims instead of the above description. All equivalent meanings and scope which fall within the appended claims must be deemed falling within the scope of the appended claims.

What is claimed is:

1. A computer-implemented method for computerized administration of reward schemes, the method comprising:

pre-defining, by a user-facing local computer system, a first reward scheme, the first reward scheme defining a first reward event which is to trigger provision of a first reward to the user, wherein the first reward scheme is owned by the user-facing local computer system;

obtaining, by the user-facing local computer system, from a remote computer system remote from the local computer system, a second reward scheme, the second reward scheme defining a second reward event which is to trigger provision of a second reward to the user, the second reward scheme being owned by another computer system other than the user-facing local computer system, the first reward scheme being a different reward scheme than the second reward scheme and having different (i) reward events, (ii) reward scheme ownership, (iii) rewards, and (iv) reward accounts than those of the second reward scheme;

based on a purchase action by the user, the purchase action effecting a purchase transaction, using the user-facing local computer system, the purchase action being applicable to the first reward scheme and the second reward scheme, determining (i) applicability of the purchase action to the first reward scheme and whether the first reward event has been triggered in response to the purchase action by the user and (ii) applicability of the purchase action to the second reward scheme and whether the second reward event has been triggered in response to the purchase action by the user, wherein applicability of the purchase action to the first reward scheme and whether the first reward event is triggered in response to the purchase action by the user is independent of applicability of the purchase action to the second reward scheme and whether the second reward event is triggered in response to the purchase action by the user, and wherein any obligation of granting the first reward is independent of any obligation of granting the second reward;

based on the first reward event having been triggered by the purchase action, determining, by the user-facing local computer system, the first reward for the user according to the first reward scheme; and based on the second reward event having been triggered by the purchase action, notifying, by the user-facing local computer system, a predetermined entity of the second reward event or determining, by the user-facing local computer system, the second reward for the user according to the second reward scheme.

2. The method of claim 1, wherein the determining the first reward for the user further comprises: saving the first reward in a member reward account of the user maintained by the user-facing local computer system, and wherein the determining the second reward for the user further comprises: saving the second reward in an external reward account of the user external to the user-facing local computer system.

3. The method of claim 2, further comprising:
pre-defining a display structure; and
displaying, by the user-facing local computer system, accumulated rewards in the external reward account according to the display structure in response to a user request.

4. The method of claim 2, further comprising:
obtaining, by the user-facing local computer system, an external display structure externally; and
displaying, by the user-facing local computer system, accumulated rewards in the external reward account according to the external display structure in response to a user request.

5. The method of claim 1, wherein the determining the second reward for the user further comprises modifying the second reward scheme according to a predetermination, and determining the second reward for the user according to the second reward scheme after modification.

6. The method of claim 5, wherein the determining the first reward for the user further comprises: saving the first reward in a member reward account of the user maintained by the user-facing local computer system, and wherein the determining the second reward for the user further comprises: saving the second reward in the member reward account.

7. The method of claim 1, wherein the determining the first reward for the user further comprises: saving the first reward in a member reward account of the user maintained by the user-facing local computer system, and wherein the determining the second reward for the user further comprises: establishing, by the user-facing local computer system, a dummy reward account of the user and saving the second reward in the dummy reward account, wherein the dummy reward account is maintained by the user-facing local computer system.

8. The method of claim 7, wherein the establishing the dummy reward account of the user further comprises: generating, by the user-facing local computer system, an authorization code for the dummy reward account, and providing the authorization code to the user, wherein the authorization code is used by the user to indicate that the user-facing local computer system transfer the second reward from the dummy reward account to an external reward account external to the user-facing local computer system.

9. The method of claim 1, further comprising:
obtaining a third reward scheme defining a third reward event;
determining whether the third reward event has been triggered in response to the purchase action by the user; and
based on the third reward event having been triggered, modifying, by the user-facing local computer system, the third reward scheme according to a predetermination, and calculating a third reward for the user according to the third reward scheme after modification.

10. The method of claim 9, wherein the second reward scheme is unmodifiable by the user-facing local computer system performing the modifying the third reward scheme.

11. The method of claim 1, wherein the second reward scheme is obtained by the user-facing local computer system as an inheritance of rules within an organization, and the first reward scheme is established by the user-facing local computer system.

12. The method of claim 1, wherein the determining the first reward for the user further comprises: establishing, by the user-facing local computer system, a dummy reward account of the user, maintaining, by the user-facing local computer system, the dummy reward account of the user, and saving, by the user-facing local computer system, the first reward in the dummy reward account based on a determination that the user does not have a member reward account.

13. The method of claim 1, further comprising:
based on determining that the second reward scheme is modifiable, modifying, by the user-facing local computer system, the second reward scheme, wherein the determining the second reward for the user according to the second reward scheme is made after modifying the second reward scheme; or
based on the second reward event having been triggered and the second reward scheme having not been modified, notifying, by the user-facing local computer system, the predetermined entity of the second reward event.

14. The method of claim 1, wherein a change in a reward account of the first reward scheme does not require a change in a reward account of the second reward scheme.

15. A computer system comprising:
a memory; and
a processor in communication with the memory, wherein the computer system is configured to perform a method comprising:
pre-defining, by a user-facing local computer system, a first reward scheme, the first reward scheme defining a first reward event which is to trigger provision of a first reward to the user, wherein the first reward scheme is owned by the user-facing local computer system;
obtaining, by the user-facing local computer system, from a remote computer system remote from the local computer system, a second reward scheme, the second reward scheme defining a second reward event which is to trigger provision of a second reward to the user, the second reward scheme being owned by another computer system other than the user-facing local computer system, the first reward scheme being a different reward scheme than the second reward scheme and having different (i) reward events, (ii) reward scheme ownership, (iii) rewards, and (iv) reward accounts than those of the second reward scheme;
based on a purchase action by the user, the purchase action effecting a purchase transaction, using the user-facing local computer system, the purchase action being applicable to the first reward scheme and the second reward scheme, determining (i) applicability of the purchase action to the first reward scheme and whether the first reward event has been triggered in response to the purchase action by the user and (ii) applicability of the second reward scheme and whether the second reward event has been triggered in response to the purchase action by the user, wherein applicability of the purchase action to the first reward scheme and whether the first reward event is triggered in response to the purchase action by the user is independent of applicability of the purchase action to the second reward scheme and whether the second reward event is triggered in response to the purchase action by the user, and wherein any obligation of granting the first reward is independent of any obligation of granting the second reward;

based on the first reward event having been triggered by the purchase action, determining, by the user-facing local computer system, the first reward for the user according to the first reward scheme; and based on the second reward event having been triggered by the purchase action, notifying, by the user-facing local computer system, a predetermined entity of the second reward event or determining, by the user-facing local computer system, the second reward for the user according to the second reward scheme.

16. The computer system of claim 15, wherein the determining the first reward for the user further comprises: saving the first reward in a member reward account of the user maintained by the user-facing local computer system, and wherein the determining the second reward for the user further comprises: saving the second reward in an external reward account of the user external to the user-facing local computer system.

17. The computer system of claim 15, wherein the determining the second reward for the user further comprises modifying the second reward scheme according to a predetermination, and determining the second reward for the user according to the second reward scheme after modification.

18. The computer system of claim 15, wherein the determining the first reward for the user further comprises: saving the first reward in a member reward account of the user maintained by the user-facing local computer system, and wherein the determining the second reward for the user further comprises: establishing, by the user-facing local computer system, a dummy reward account of the user and saving the second reward in the dummy reward account, wherein the dummy reward account is maintained by the user-facing local computer system.

19. The computer system of claim 18, wherein the establishing the dummy reward account of the user further comprises: generating, by the user-facing local computer system, an authorization code for the dummy reward account, and providing the authorization code to the user, wherein the authorization code is used by the user to indicate that the user-facing local computer system transfer the second reward from the dummy reward account to an external reward account external to the user-facing local computer system.

20. A computer program product comprising:
a non-transitory computer readable storage medium readable by a processing circuit and storing instructions for execution by the processing circuit for performing a method comprising:

pre-defining, by a user-facing local computer system, a first reward scheme, the first reward scheme defining a first reward event which is to trigger provision of a first reward to the user, wherein the first reward scheme is owned by the user-facing local computer system;

obtaining, by the user-facing local computer system, from a remote computer system remote from the local computer system, a second reward scheme, the second reward scheme defining a second reward event which is to trigger provision of a second reward to the user, the second reward scheme being owned by another computer system other than the user-facing local computer system, the first reward scheme being a different reward scheme than the second reward scheme and having different (i) reward events, (ii) reward scheme ownership, (iii) rewards, and (iv) reward accounts than those of the second reward scheme;

based on a purchase action by the user, the purchase action effecting a purchase transaction, using the user-facing local computer system, the purchase action being applicable to the first reward scheme and the second reward scheme, determining (i) applicability of the purchase action to the first reward scheme and whether the first reward event has been triggered in response to the purchase action by the user and (ii) applicability of the purchase action to the second reward scheme and whether the second reward event has been triggered in response to the purchase action by the user, wherein applicability of the purchase action to the first reward scheme and whether the first reward event is triggered in response to the purchase action by the user is independent of applicability of the purchase action to the second reward scheme and whether the second reward event is triggered in response to the purchase action by the user, and wherein any obligation of granting the first reward is independent of any obligation of granting the second reward;

based on the first reward event having been triggered by the purchase action, determining, by the user-facing local computer system, the first reward for the user according to the first reward scheme; and based on the second reward event having been triggered by the purchase action, notifying, by the user-facing local computer system, a predetermined entity of the second reward event or determining, by the user-facing local computer system, the second reward for the user according to the second reward scheme.

* * * * *